United States Patent
Yi et al.

(10) Patent No.: US 12,126,010 B2
(45) Date of Patent: Oct. 22, 2024

(54) CATHODE WITH DISORDERED ROCKSALT MATERIAL AND METHOD OF FORMING THE CATHODE

(71) Applicant: Wildcat Discovery Technologies, Inc., San Diego, CA (US)

(72) Inventors: Tanghong Yi, San Diego, CA (US); Bin Li, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

(21) Appl. No.: 18/522,554

(22) Filed: Nov. 29, 2023

(65) Prior Publication Data
US 2024/0097108 A1   Mar. 21, 2024

Related U.S. Application Data

(62) Division of application No. 16/996,515, filed on Aug. 18, 2020, now Pat. No. 11,870,056.

(51) Int. Cl.
*H01M 4/13915* (2010.01)
*C01G 45/00* (2006.01)
*H01M 4/02* (2006.01)
*H01M 4/04* (2006.01)
*H01M 4/1315* (2010.01)
(Continued)

(52) U.S. Cl.
CPC ...... *H01M 4/13915* (2013.01); *C01G 45/006* (2013.01); *H01M 4/0404* (2013.01); *H01M 4/0471* (2013.01); *H01M 4/1315* (2013.01); *H01M 4/485* (2013.01); *H01M 10/0525* (2013.01); *H01M 10/058* (2013.01); *C01P 2004/02* (2013.01); *C01P 2004/32* (2013.01); *C01P 2004/61* (2013.01); *C01P 2004/62* (2013.01); *C01P 2004/80* (2013.01); *C01P 2006/40* (2013.01); *H01M 2004/021* (2013.01); *H01M 2004/028* (2013.01)

(58) Field of Classification Search
CPC ............ H01M 4/13915; H01M 4/131; H01M 4/0404; H01M 4/0471; H01M 4/1315; H01M 4/485
See application file for complete search history.

(56) References Cited

U.S. PATENT DOCUMENTS

| | | |
|---|---|---|
| 9,692,043 B2 | 6/2017 | Takeuchi et al. |
| 10,280,092 B2 | 5/2019 | Carroll et al. |
| 2014/0099549 A1 | 4/2014 | Ceder et al. |

FOREIGN PATENT DOCUMENTS

CN    109987650 A    7/2019

OTHER PUBLICATIONS

Lee et al. "Mitigating oxygen loss to improve the cycling performance of high capacity cation-disordered cathode materials." Nat. Commun. 8:981 (10 pages).

(Continued)

*Primary Examiner* — Sarah A. Slifka
(74) *Attorney, Agent, or Firm* — Young Basile Hanlon & MacFarlane, P.C.

(57) ABSTRACT

A method for forming a cathode includes milling a suspension of precursors via a micromedia mill to form a mixture of primary particles in the suspension. The precursors include one or more metal compounds. The method includes spray drying the suspension after the milling to form secondary particles. The secondary particles are agglomerations of the primary particles. The method also includes annealing the secondary particles to form a disordered rocksalt powder.

6 Claims, 3 Drawing Sheets

(51) Int. Cl.
    *H01M 4/485*     (2010.01)
    *H01M 10/0525*     (2010.01)
    *H01M 10/058*     (2010.01)

(56) References Cited

OTHER PUBLICATIONS

Wang et al. "A disordered rock-salt Li-excess cathode material with high capacity and substantial oxygen redox activity: Li1.25Nb0.25Mn0.5O2." Electrochemistry Communications 60; 2015 (4 pages).
Yabuuchi et al. "High-capacity electrode materials for rechargeable lithium batteries: Li3NbO4-based system with cation-disordered rocksalt structure" Proc. Natl. Acad. Sci. 2015; (6 pages).

ic application Ser. No. 16/996,515 filed on Aug. 18, 2020, the contents of which are incorporated herein by reference in their entirety for all purposes.

CATHODE WITH DISORDERED ROCKSALT MATERIAL AND METHOD OF FORMING THE CATHODE

This application is a division of U.S. patent application Ser. No. 16/996,515 filed on Aug. 18, 2020, the contents of which are incorporated herein by reference in their entirety for all purposes.

BACKGROUND

The present invention is in the field of battery technology.

Lithium metal oxides have been used to formulate cathode materials for lithium ion batteries. The cathodes are derived from a few basic crystallographic structure types, such as spinels, olivines, and layered oxide structures. The layered oxide structures have included lithium-excess type structures, where additional lithium is present in the structure.

Recently, attention has been focused on disordered rocksalt structures, such as those formed from particular lithium metal oxides. Compounds represented by the formula:

$$xLi_3NbO_4 \cdot (1-x)LiMO_2 \qquad (1)$$

where M is a divalent or trivalent cation, have been shown to be a promising class of transition metal oxides for use as cathodes in lithium ion batteries. The compounds of formula (1) are considered a disordered rocksalt in which a random atomic arrangement of lithium and transition metal ions are packed in a closely-packed cubic structure. These disordered rocksalt compositions offer the ability to contain up to 3 lithium atoms per formula unit, which is more than the conventional lithium-excess layered materials. Formula (1) can be transformed and represented as $Li_xM_yN_zO_w$.

The disordered rocksalt structure is an attractive cathode material for next generation lithium ion batteries due to a greater specific energy density (e.g., a higher theoretical energy density) than state-of-the-art cathode materials, such as layered lithium metal oxide structures. For example, certain disordered rocksalt structure materials have a theoretical gravimetric energy density of about 1120 Wh/kg, while a $LiMn_2O_4$ active material has a theoretical gravimetric energy density of about 492 Wh/kg and a $LiMn_{1.5}Ni_{0.5}O_4$ has a theoretical gravimetric energy density of about 691 Wh/kg. This energy density is especially appealing when lower cost raw materials are used as components in the disordered rocksalt structure, such as manganese. As such, the disordered rocksalt materials can achieve relatively high energy density with relatively low material cost. In order to achieve comparable energy density, known cathode materials require higher-cost raw materials, such as cobalt or nickel.

The challenge of disordered rocksalt materials is relatively poor conductivity. One strategy to promote battery material conductivity is to reduce particle size in an attempt to shorten electron and ion transport pathways. Reducing the particle size may increase conductivity by shortening the electron and ion transport pathways. Unfortunately, the smaller particle sizes also inherently limit the volumetric energy density of the electrode, which reduces the energy density of the battery cell. Thus, at least some of the benefits of high energy density inherent in the disordered rocksalt materials are sacrificed in order to mitigate the conductivity issue.

BRIEF SUMMARY

In one or more embodiments, a method for forming a cathode is provided that includes milling a suspension of precursors via a micromedia mill to form a mixture of primary particles in the suspension. The precursors include one or more metal compounds. The method includes spray drying the suspension after the milling to form secondary particles. The secondary particles are agglomerations of the primary particles. The method also includes annealing the secondary particles to form a disordered rocksalt powder.

In one or more embodiments, a cathode for a rechargeable battery is provided. The cathode includes a disordered rocksalt powder characterized by secondary particles having an average particle size no less than 1 micrometer and no greater than 20 micrometers. Each of the secondary particles is an agglomeration of primary particles. The primary particles have an average particle size no greater than 400 nanometers.

In one or more embodiments, a method for forming a lithium ion battery is provided that includes milling a suspension of precursors to form a mixture of primary particles in the suspension. The precursors include one or more metal compounds. The method includes spray drying the suspension after the milling to form secondary particles. The secondary particles are agglomerations of the primary particles. The method includes annealing the secondary particles to form a disordered rocksalt powder, and milling the disordered rocksalt powder with one or more carbon precursors after the annealing. The method also includes mixing the disordered rocksalt powder with one or more solvents to form a slurry, drying the slurry on a metal current collector to form a composite cathode film, inserting the composite cathode film into a cell casing such that a separator is disposed between the composite cathode film and an anode, and supplying an electrolyte into the cell casing.

DETAILED DESCRIPTION

Figure 1:
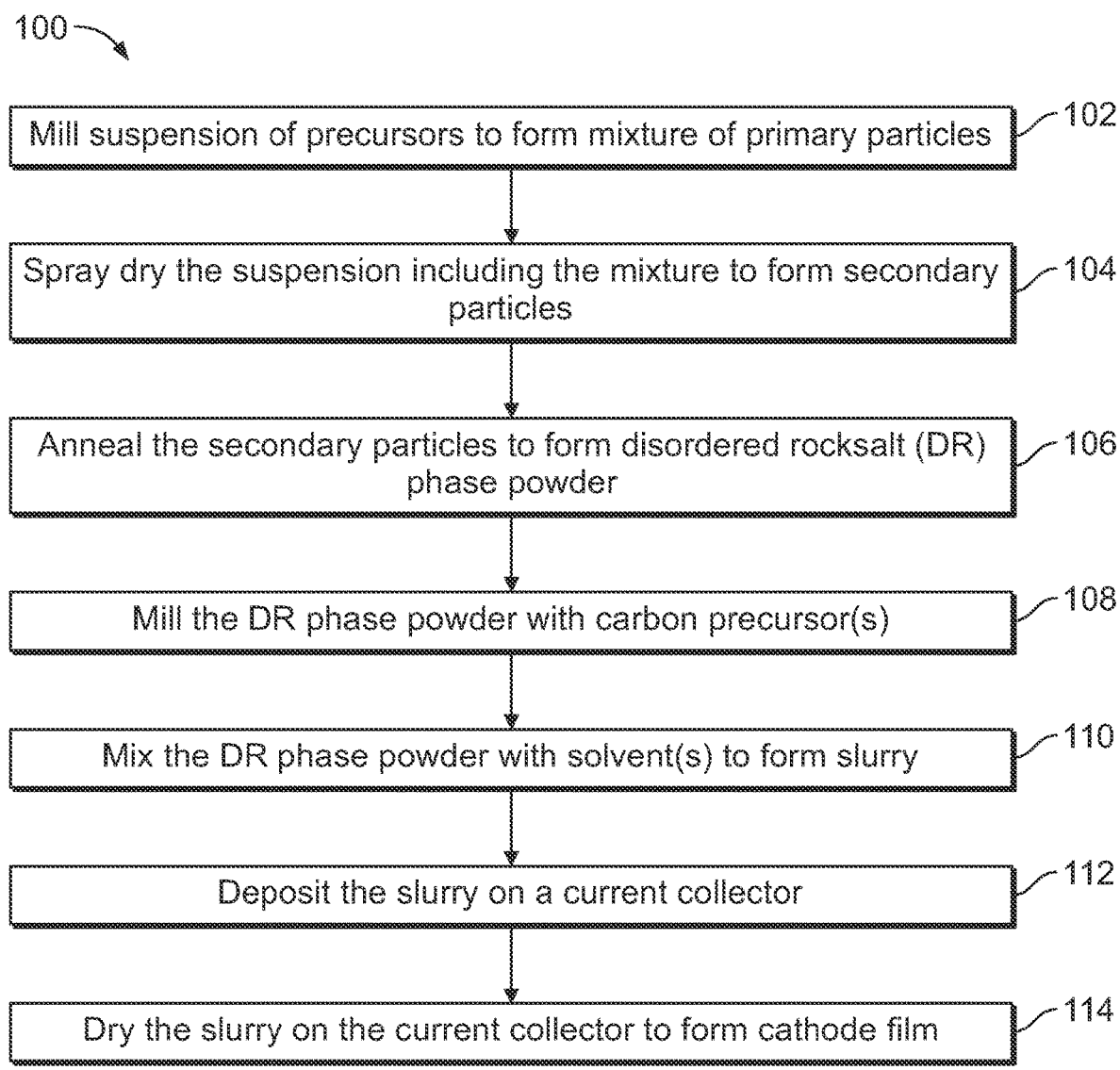
FIG. 1 is a flow chart of a method for forming a cathode of a lithium ion battery according to an embodiment.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

To the extent certain battery characteristics can vary with temperature, such characteristics are specified at 30 degrees C., unless the context clearly dictates otherwise.

Ranges presented herein are inclusive of their endpoints. Thus, for example, the range 1 to 3 includes the values 1 and 3 as well as the intermediate values.

Embodiments of the inventive subject matter provide disordered rocksalt compositions and morphology (e.g., structure) for use in formulating electrodes of electrochemical cells. More specifically, the disordered rocksalt materials disclosed herein can be used to form the cathode. The electrochemical cells that utilize the disordered rocksalt materials disclosed herein may be lithium ion batteries. The lithium ion batteries can be secondary or rechargeable batteries. For example, discharge and recharge of the lithium ion battery may be accomplished by intercalation and de-intercalation, respectively, of lithium ions into and from the cathode. The lithium ion battery includes an electrolyte formulation with a lithium salt present at a concentration suitable for conducting the lithium ions through the electrolyte formulation between the cathode and an anode during the discharge and recharge operations.

In a disordered rocksalt composition, both lithium and a transition metal occupy a cubic close-packed lattice of octahedral sites. In electrochemical reactions, lithium diffusion proceeds by the lithium hopping from one octahedral site to another octahedral site via an intermediate tetrahedral site. Lithium in the intermediate tetrahedral site is the activated state in lithium diffusion. The activated tetrahedral lithium ion shares faces with four octahedral sites as follows: (i) the site previously occupied by the lithium ion itself; (ii) the vacancy the lithium ion will move into; and (iii & iv) two sites that can be occupied by lithium, a transition metal, or a vacancy.

In order to provide short electron and ion transport pathways to provide suitable conductivity without sacrificing electrode energy density, the disordered rocksalt morphology in the cathodes described herein includes micro-sized clusters or agglomerations of sub-micro-sized particles. The micro-sized clusters are also referred to herein as secondary particles. The secondary particles have average particle sizes (e.g., diameters) in the micrometer scale, such as between 1 micrometer and 20 micrometers. The sub-micro-sized particles cluster to form the secondary particles. The sub-micro-sized particles are also referred to herein as primary particles. The terms "primary" and "secondary" indicate that the primary particles are formed before the secondary particles, and the secondary particles are agglomerations of the primary particles. The primary particles have average particle sizes (e.g., diameters) in the nanometer scale, such as less than 400 nanometers. The sub-micro primary particles of disordered rocksalt material provide desirable conductivity and the micro-sized secondary particles of the disordered rocksalt material yield high electrode energy density. As such, forming a disordered rocksalt morphology that has micro-sized agglomerations of sub-micro-sized particles provides the high energy density associated with disordered rocksalt material without compromising conductivity.

One or more embodiments disclose the synthesis of a disordered rocksalt cathode active material. The morphology of the active material includes micro-sized spherical secondary particles that are agglomerations of smaller primary particles, as described above. The synthesis includes milling metal precursors to produce a homogenous mixture of nano-sized precursor particles. Then, the mixture is spray dried to generate spherical precursor particles with controlled particle sizes. The spray drying produces micro-sized spherical precursor particles that are clusters or agglomerations of the nano-sized precursor particles. The spherical precursor particles are then subjected to annealing which produces the disordered rocksalt phase. The annealing conditions are selected to retain the particle morphology, such that the resulting disordered rocksalt phase has the micro-sized spherical secondary particles that are agglomerations of the smaller, primary particles. Experimental testing of the embodiments disclosed herein indicated good rate performance of 272 mAh/g at C/10 at 30° C. when cycled from 1.5 V to 4.8 V and 193 mAh/g at 1 C at 30° C. when cycled from 1.5 V to 4.8 V.

Known disordered rocksalt morphologies lack the spherical, micro-sized secondary particles that are clusters of smaller, primary particles, according to the embodiments described herein. For example, known disordered rocksalt materials are synthesized through traditional, solid-state chemistry and/or the molten salt method, which produce large particle sizes of single crystals and polycrystals. Due in part to the large particles, the disordered rocksalt material produced via known methods suffers from poor conductivity.

The disordered rocksalt cathode active material that is formed according to the process described herein to include the secondary particle morphology described herein can have various compositions. For example, several disordered rocksalt material compositions are disclosed in U.S. application Ser. No. 15/222,377 (now U.S. Pat. No. 10,280,092), which is incorporated by reference herein in its entirety. The disordered rocksalt composition generally includes lithium, transition metals, and oxygen. One or more of the transition metal or oxygen sites may be doped for improved electrochemical performance. In a non-limiting example, the oxygen site is doped with fluorine. A general formula for doping at the oxygen sites is:

$$Li_xN_yM_zO_{2-a}F_a \qquad (1)$$

where $1.0<x<1.65$; $0.01<y<0.55$; $0.1<z<1$; $0 \leq a<0.5$; N is one of Ti, Ta, Zr, W, Nb, or Mo; and M is one of Ti, V, Cr, Mn, Fe, Co, Ni, Cu, Zn, Al, Zr, Y, Mo, Ru, Rh or Sb. These compositions have demonstrated excellent specific capacity or energy density, such as ~350 mAh/g at 55° C. and C/40, and ~300 mAh/g at 30° C. and C/15.

When a>0, the presence of fluorine dopants at the oxygen site in the disordered rocksalt may improve the electrochemical performance of the lithium ion battery cell. Without being bound by a particular theory or mechanism of action, anionic substitution of fluorine for oxygen (forming a oxyfluoride) can enhance cycling performance by having a greater resistance to hydrogen fluoride attack from electrolyte decomposition at high voltage. Alternatively, the higher iconicity in the metal-fluorine bond over that of the metal-oxygen bond can result in less transition metal leaching from the cathode to the electrolyte, further stabilizing the structure.

In a non-limiting example, the disordered rocksalt composition may lack niobium. In another non-limiting example, the N and/or M transition metal sites may be doped instead of, or in addition to, the oxygen site.

FIG. 1 is a flow chart of a method 100 for forming a cathode of a lithium ion battery according to an embodiment. The method 100 may be performed by one or more components of laboratory or industrial equipment. The method 100 is used to generate disordered rocksalt (DR) active material for the cathode, which provides high energy density and satisfactory conductivity. Optionally, the method 100 can include more steps than described herein, fewer steps than described herein, and/or different steps than described herein.

At 102, a suspension of precursors are milled to form a mixture of primary particles in the suspension. The precursors include metal compounds and are selected based on the desired composition of the DR material. One or more of the precursors are metal oxides, such as $Mn_2O_3$, $LiOH$, $Nb_2O_5$. For doping the oxygen site with fluorine, at least one precursor includes fluorine. Possible fluorine-containing precursors can include $LiF$, $NbF_5$, and/or the like. In a non-limiting example, the precursors can include one or more of $Mn_2O_3$, $Li_2CO_3$, $LiF$, $LiOH$, $Nb_2O_5$, $NbF_5$, and/or the like. The precursors may be mixed, at stoichiometric amounts, in deionized water to make the suspension. The milling may be performed via a micromedia mill. The micromedia mill may include concentric cylinders with a milling media present in an annular gap between the cylinders. The milling media grinds the precursors in the suspension as the cylinders are rotated relative to each other to create small nano-sized primary particles. The micromedia mill may also be designed to form homogenously-sized particles such that all of the primary precursor particles have approximately the same size, within a designated range. The primary particles out of the mill may have an average particle size that is no greater than 400 nanometers (nm). Optionally, the average particle size may be no greater than 200 nm, 100 nm, or less. For example, the average particle size could be no greater than 50 nm, 40 nm, 30 nm, 20 nm, or the like. In a non-limiting example, the micromedia mill is a laboratory bead mill, such as the Buhler PML2 product, which is trademark of the Buhler Group.

At 104, after milling the suspension, the suspension including the mixture of nano-sized precursor particles is spray dried to form secondary particles. Spray drying the suspension includes emitting the suspension at high pressure through a nozzle, which causes the suspension to form an aerosol. In a non-limiting example, the spray drying may be performed using a mini spray dryer, such as the Buchi B-290 model, which is a trademark of Buchi. Each droplet of the aerosol includes the solvent, such as water, with small primary particles. As the aerosol rapidly dries, the solvent evaporates and the primary particles coalesce and form the secondary particles. The secondary precursor particles are clusters or agglomerations of the primary particles. The small, relatively uniform size profile of the primary particles in the aerosol enable the primary particles to agglomerate during the drying process. In an embodiment, the spray drying causes the secondary particles to be spherical in shape. For example, the secondary particles are approximately spherical and may appear as spheres when viewed through a microscope.

Figure 2:
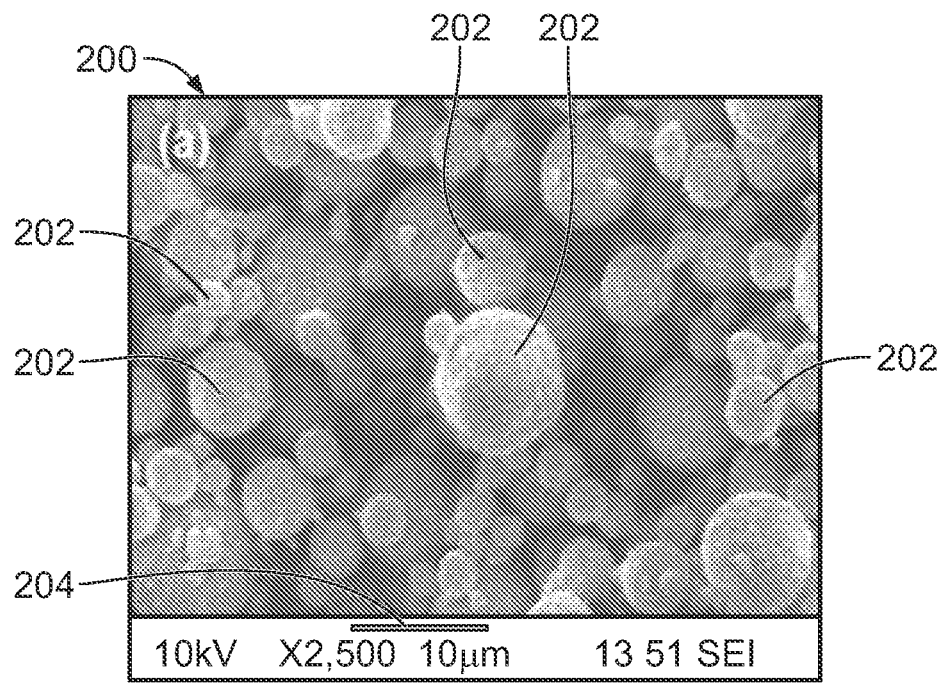
FIG. 2 is a magnified image of a suspension showing disordered rocksalt secondary particles after spray drying according to an embodiment.

FIG. 2 is a magnified image 200 of the suspension showing the DR secondary particles 202 after spray drying according to an embodiment. The image is enlarged at the micrometer scale and includes an indicator 204 that represents 10 micrometers (μm). As shown in FIG. 2, the secondary particles 202 are spherical in shape and have sizes in the range from about 1 μm to about 10 μm. Optionally, some of the secondary particles 202 may be larger than shown in FIG. 2, such as having a diameter of about 20 μm, and other secondary particles 202 may be slightly smaller than 1 μm, such as 0.5 μm.

Returning now to the method 100, the secondary particles are annealed at 106 after the spray drying to form a DR phase powder. The relatively high temperatures experienced cause the precursors in the secondary particles to react and form a unitary phase. The phase is formed at the elemental level, but the conditions of the annealing step are selected to maintain the morphology during the calcination. For example, the resulting DR phase powder retains the microsized, spherical secondary particles. The annealing conditions may include heating the particles at a temperature within a range from 750° C. to 900° C. for a time period that is between 6 hours and 24 hours. Annealing at temperatures outside of the specified range for longer or shorter periods of time than the specified time period may cause the secondary particles to merge and fuse into large structures, which significantly diminishes the conductivity of the resulting DR phase. Furthermore, the annealing process may be performed under argon gas flow. Alternatively, the annealing environment may be nitrogen gas or air instead of argon gas. In other embodiments, the annealing conditions may be selected based on the compositions of the disordered rocksalt precursors, such as which metals are present. For example, a manganese-based composition may utilize the conditions above (e.g., 750-900° C. for between 6 and 24 hours), whereas a composition based on another metal may have a broader temperature range, a higher range, or a lower range and/or a broader, longer, or shorter range of time periods. In a non-limiting example, the temperature range may be from 500° C. to 1200° C. for a time period that is between 3 hours and 48 hours.

Figure 3:
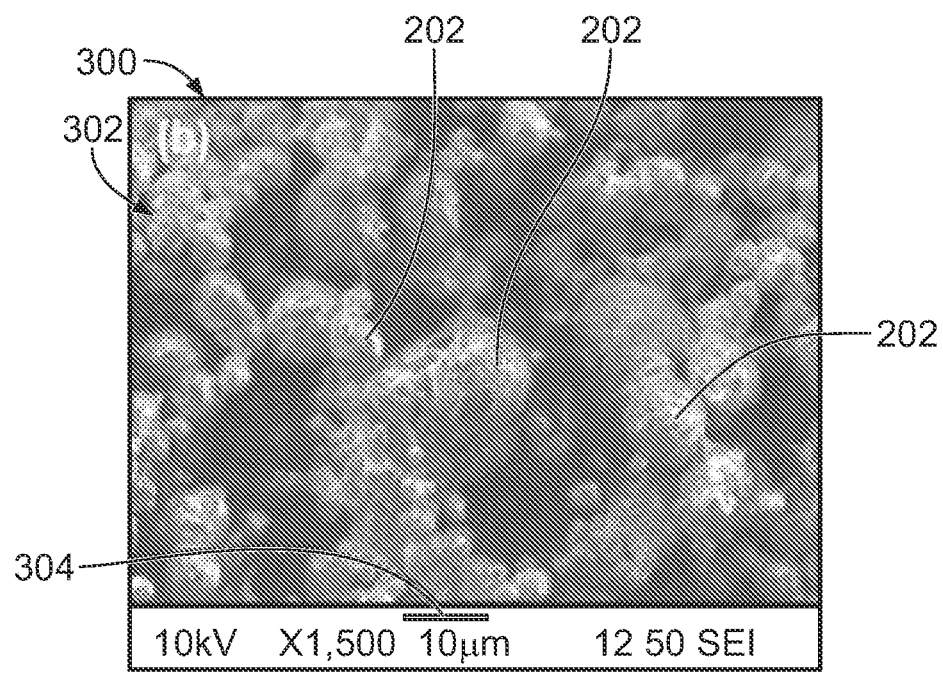
FIG. 3 is a magnified image of the secondary particles of the disordered rocksalt after annealing according to an embodiment.

FIG. 3 is a magnified image 300 of the secondary particles 202 of the DR phase powder 302 after the annealing process. The scale of the image 300 is slightly reduced relative to the image 200 shown in FIG. 2. For example, the indicator 304 that represents 10 μm is slightly shorter than the length of the indicator 204 in FIG. 2. The post-calcination secondary particles 202 in FIG. 3 appear slightly different than the pre-annealed particles 202 in FIG. 2, but retain the same shape and size.

Figure 4:
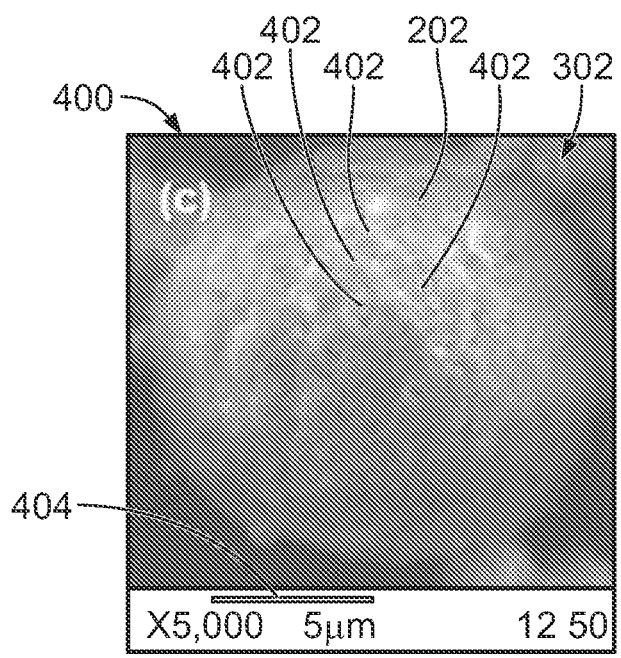
FIG. 4 is a magnified image showing an enlarged view of one secondary particle of the disordered rocksalt relative to FIG. 3 according to an embodiment.

FIG. 4 is a magnified image 400 showing an enlarged view of one secondary particle 202 of the DR phase powder 302 according to an embodiment. The indicator 404 represents 5 μm in length. As shown in FIG. 4, the secondary particle 202 has a size (e.g., diameter) of approximately 10 μm. The surface of the particle 202 is a patchwork of small bumps 402, which represent the nano-sized primary particles that agglomerated to form the secondary particle 202.

In an alternative embodiment, instead of milling and spray drying the lithium-containing precursors with the other precursors, the lithium source may be kept aside until the anneal step. For example, the spherical secondary particles may be produced as described above, except that the precursors lack lithium. The lithium source, such as $Li_2CO_3$, LiOH, and/or LiF, may be mixed and annealed with the pre-made secondary particles at 106 to undergo calcination with the secondary particles. The secondary particles 202 of the DR phase powder 302 shown in FIGS. 3 and 4 may be the same or similar regardless of whether the lithium is present at the milling step at 102 or not present until the annealing step at 106.

In another alternative embodiment, the DR phase may be formed prior to milling. For example, the DR phase can be formed via a solid state chemistry method, such as a solid-state redox reaction of oxide ions. The formed DR phase, rather than the precursors, is milled at 102 to form the suspension of primary particles. Then, the suspension of primary particles of pre-formed DR phase is spray dried at 104 to form the secondary particles. Because the DR phase is pre-formed, the annealing step at 106 may have reduced conditions, such as lower temperature and/or lower time period in this embodiment relative to the embodiments previously described, or may be omitted entirely. Alternatively, the annealing step at 106 may be unchanged from the previously-described embodiments.

Returning to the method 100 in FIG. 1, after annealing the DR phase powder is milled with one or more carbon precursors at 108. The milling with carbon precursors may form a carbon coating on the secondary particles. The one or more carbon precursors may include acetylene black, carbon black, carbon fiber, graphite, carbon nano-tube, KJ600, and/or the like. In an embodiment, the one or more carbon precursors are milled at a ratio in which the disordered rocksalt powder represents a majority portion and the carbon precursors represent a minority portion. For example, the ratio may be 60:40, 70:30, 80:20, or 90:10 DR phase powder to the carbon precursor(s). In a non-limiting example used in experimental testing, the ratio is 80:20 DR phase powder to carbon precursor(s).

At 110, the DR phase powder is mixed with one or more solvents to form a slurry. Non-limiting examples of the one or more solvents include poly(vinylidene fluoride) and 1-methyl-2-pyrrolidinone. At 112, the resulting slurry is deposited on a metal current collector. The metal current collector may be stainless steel. At 114, the slurry on the metal current collector is dried to form a composite cathode film.

In an embodiment, the cathode film produced via the method 100 described above in FIG. 1 has a disordered rocksalt powder. The morphology of the disordered rocksalt powder is characterized by secondary particles having an average particle size no less than 1 micrometer and no greater than 20 micrometers. Each of the secondary particles is an agglomeration of primary particles. The primary particles have an average particle size no greater than 400 nanometers.

The cathode active material described herein can be utilized in a rechargeable lithium ion battery cell. The battery cell includes the cathode and an anode separated by a polymer separator. The battery cell includes an electrolyte that enables ion and electron transport between the cathode and the anode. The cathode active material described herein can be used in conjunction with various types and compositions of the anode and the electrolyte.

In a non-limiting example, a rechargeable battery was formed in a high purity argon filled glovebox (M-Braun, $O_2$ and humidity content <0.1 ppm). The DR composite cathode film was used as the cathode. For the anode, a thin Li foil was cut into the required size. Each battery cell included the composite cathode film, a polypropylene separator, and a lithium foil anode. The electrolyte contains lithium hexafluororophosphate in a mixture of ethylene carbonate and ethyl methyl carbonate solvents with an additive. The battery cell was sealed and cycled between 1.5 V and 4.8 V at 55° C. or, in some cases, 30° C.

Figure 5:
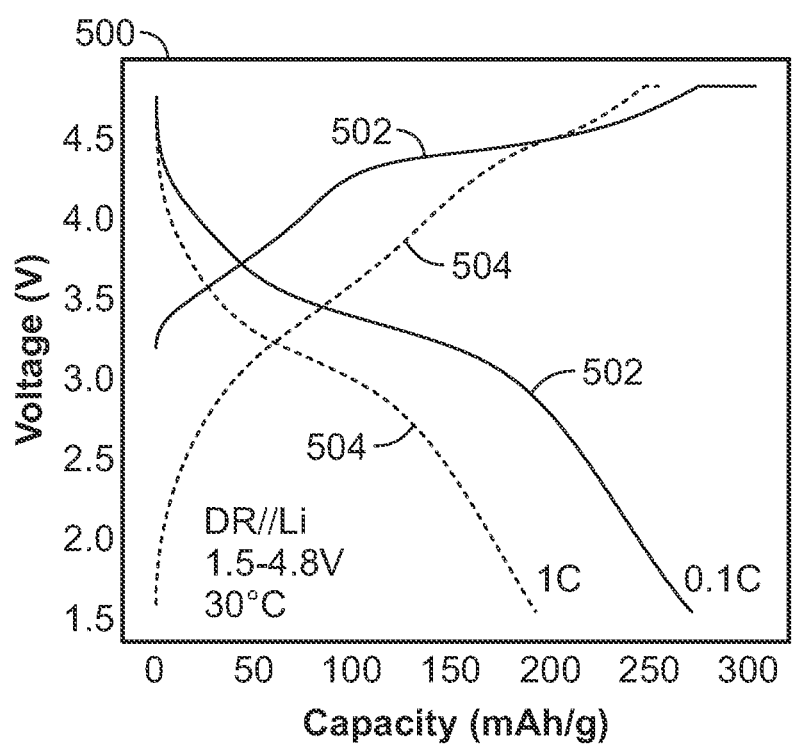
FIG. 5 is a graph plotting voltage profiles of spherical secondary particles of the disordered rocksalt phase powder at 0.1 C and 1 C discharge rates.

FIG. 5 is a graph 500 plotting voltage profiles 502, 504 of spherical secondary particles of the DR phase powder at 0.1 C and 1 C discharge rates. The voltage profiles 502, 504 represent experimental data measured when cycling the battery cell described above between 1.5 V and 4.8 V at 30° C. The profile 502 represents the discharge rate 0.1 C (or C/10), and the profile 504 represents the discharge rate 1 C. FIG. 5 indicates that the tested battery cells demonstrated a capacity of 272 mAh/g at 0.1 C (1.5 V to 4.8 V) and 193 mAh/g at 1 C. These results show a good rate performance of 71% 1 C/0.1 C capacity retention (e.g., 193 mAh/g divided by 272 mAh/g).

In an embodiment, a method for forming a cathode includes milling a suspension of precursors via a micromedia mill to form a mixture of primary particles in the suspension. The precursors include one or more metal compounds. The method includes spray drying the suspension after the milling to form secondary particles. The secondary particles are agglomerations of the primary particles. The method also includes annealing the secondary particles to form a disordered rocksalt powder.

Optionally, the spray drying forms the secondary particles to have an average particle size no less than 1 micrometer and no greater than 20 micrometers. The milling may form the mixture of primary particles such that the primary particles have an average particle size no greater than 400 nanometers. Optionally, the precursors include $Mn_2O_3$, $Li_2CO_3$, LiF, LiOH, $Nb_2O_5$, and/or $NbF_5$. The annealing may be performed under argon gas flow. The annealing may be performed within a temperature range from 750 degrees C. to 900 degrees C. for a time no less than 6 hours and no greater than 24 hours. Optionally, the spray drying forms the secondary particles to be spherical in shape.

Optionally, the disordered rocksalt powder is represented by formula (i):

$$Li_xN_yM_zO_2\text{-}aF_a \qquad (i)$$

where $1.0<x<1.65$; $0.01<y<0.55$; $0.1<z<1$; $0\leq a<0.5$; N is one of Ti, Ta, Zr, W, Nb, or Mo; and M is one of Ti, V, Cr, Mn, Fe, Co, Ni, Cu, Zn, Al, Zr, Y, Mo, Ru, Rh or Sb. Optionally, $a>0$.

Optionally, the method also includes milling the disordered rocksalt powder with one or more carbon precursors after the annealing. The disordered rocksalt powder may be milled with the one or more carbon precursors in a ratio in which the disordered rocksalt powder represents a majority portion and the one or more carbon precursors represent a minority portion. Optionally, the method also includes mixing the disordered rocksalt powder with one or more solvents to form a slurry, depositing the slurry on a metal current collector, and drying the slurry on the metal current collector to form a composite cathode film.

In an embodiment, a cathode for a rechargeable battery includes a disordered rocksalt powder characterized by secondary particles having an average particle size no less than 1 micrometer and no greater than 20 micrometers. Each of the secondary particles is an agglomeration of primary particles. The primary particles have an average particle size no greater than 400 nanometers.

Optionally, the secondary particles are spherical in shape. The secondary particles may have a carbon coating. The particle size of the secondary particles may be no greater than 10 micrometers.

In an embodiment, a method for forming a lithium ion battery includes milling a suspension of precursors to form a mixture of primary particles in the suspension. The precursors include one or more metal compounds. The method includes spray drying the suspension after the milling to form secondary particles. The secondary particles are agglomerations of the primary particles. The method includes annealing the secondary particles to form a disordered rocksalt powder, and milling the disordered rocksalt powder with one or more carbon precursors after the annealing. The method also includes mixing the disordered rocksalt powder with one or more solvents to form a slurry, drying the slurry on a metal current collector to form a composite cathode film, inserting the composite cathode film into a cell casing such that a separator is disposed between the composite cathode film and an anode, and supplying an electrolyte into the cell casing.

The electrolyte includes a lithium salt present at a concentration suitable for conducting lithium ions through the electrolyte between the composite cathode film and the anode. The spray drying may form the secondary particles to have an average particle size no less than 1 micrometer and no greater than 20 micrometers.

As used herein, value modifiers such as "about," "substantially," and "approximately" inserted before a numerical value indicate that the value can represent other values within a designated threshold range above and/or below the specified value, such as values within 5%, 10%, or 15% of the specified value.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A cathode for a rechargeable battery, the cathode comprising:
a disordered rocksalt powder characterized by secondary particles having an average particle size no less than 1 micrometer and no greater than 20 micrometers, each of the secondary particles being an agglomeration of primary particles, the primary particles having an average particle size no greater than 400 nanometers.

2. The cathode of claim 1, wherein the disordered rocksalt powder is represented by formula (i):

$$Li_xN_yM_zO_{2-a}F_a \qquad (i)$$

where $1.0 < x < 1.65$; $0.01 < y < 0.55$; $0.1 < z < 1$; $0 \leq a < 0.5$; N is one of Ti, Ta, Zr, W, Nb, or Mo; and M is one of Ti, V, Cr, Mn, Fe, Co, Ni, Cu, Zn, Al, Zr, Y, Mo, Ru, Rh or Sb.

3. The cathode of claim 2, wherein $a > 0$.

4. The cathode of claim 1, wherein the secondary particles are spherical in shape.

5. The cathode of claim 1, wherein the secondary particles have a carbon coating.

6. The cathode of claim 1, wherein the average particle size of the secondary particles is no greater than 10 micrometers.

* * * * *